(12) United States Patent
Bourgeois

(10) Patent No.: US 8,877,853 B2
(45) Date of Patent: *Nov. 4, 2014

(54) DELAMINATION-RESISTANT MULTILAYER CONTAINER PREFORM, ARTICLE AND METHOD WITH OXYGEN BARRIER FORMULATIONS

(75) Inventor: Philip D. Bourgeois, Perrysburg, OH (US)

(73) Assignee: Graham Packaging Company, LP, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/306,230

(22) Filed: Nov. 29, 2011

(65) Prior Publication Data
US 2012/0071600 A1 Mar. 22, 2012

Related U.S. Application Data

(62) Division of application No. 10/897,867, filed on Jul. 22, 2004, now Pat. No. 8,075,966.

(51) Int. Cl.
| | |
|---|---|
| *C08K 5/098* | (2006.01) |
| *C08K 5/06* | (2006.01) |
| *C08L 23/04* | (2006.01) |
| *C08L 29/02* | (2006.01) |
| *C08L 79/00* | (2006.01) |
| *B29C 49/00* | (2006.01) |
| *B32B 27/18* | (2006.01) |
| *B65D 1/02* | (2006.01) |
| *B29C 49/22* | (2006.01) |
| *B65D 81/26* | (2006.01) |

(52) U.S. Cl.
CPC ............ *C08K 5/098* (2013.01); *B29C 49/0005* (2013.01); *B32B 27/18* (2013.01); *B65D 1/0215* (2013.01); *C08K 5/06* (2013.01); *B29B 2911/1402* (2013.01); *B29B 2911/14026* (2013.01); *B29B 2911/14053* (2013.01); *B29B 2911/14066* (2013.01); *B29B 2911/1408* (2013.01); *B29B 2911/14093* (2013.01); *B29B 2911/14113* (2013.01); *B29B 2911/1412* (2013.01); *B29B 2911/14126* (2013.01); *B29B 2911/1414* (2013.01); *B29B 2911/14146* (2013.01); *B29B 2911/14173* (2013.01); *B29B 2911/1418* (2013.01); *B29B 2911/14646* (2013.01); *B29C 49/22* (2013.01); *B29K 2995/0067* (2013.01); *B65D 81/266* (2013.01); *C08K 2201/008* (2013.01)
USPC ........... 524/502; 524/366; 524/378; 524/398; 524/612; 525/55; 525/58; 525/60; 525/186

(58) Field of Classification Search
CPC ..... C08L 23/08; C08L 29/02; C08L 2666/34; C08L 79/00; C08K 2201/008
USPC ......... 524/354, 355, 398, 500, 502, 503, 612, 524/439, 440, 366, 378; 525/50, 55, 56, 58, 525/185, 186, 60
See application file for complete search history.

(56) References Cited

U.S. PATENT DOCUMENTS

| | | | | |
|---|---|---|---|---|
| 6,106,950 | A * | 8/2000 | Searle et al. ................ | 428/423.1 |
| 6,525,123 | B1 * | 2/2003 | Yang et al. .................... | 524/398 |
| 7,491,359 | B2 * | 2/2009 | Bourgeois ..................... | 264/513 |

FOREIGN PATENT DOCUMENTS

| | | |
|---|---|---|
| EP | 1431818 A1 | 6/2004 |
| WO | WO-2004/106426 A1 * | 12/2004 |

OTHER PUBLICATIONS

Breccia, JD, et al., The role of poly(ethyleneimine) in stabilization against metal-catalyzed oxidation of proteins: a case study with lactate dehydrogenase. Biochim Biophys Acta. Apr. 15, 2002;1570(3):165-73.
Andersson MM, et al., Stabilizing effect of chemical additives against oxidation of lactate dehydrogenase. Biotechnol Appl Biochem. Dec. 2000; 32 (Pt 3):145-53.

* cited by examiner

*Primary Examiner* — Irina S Zemel
*Assistant Examiner* — Jeffrey Lenihan
(74) *Attorney, Agent, or Firm* — Novak Druce Connolly Bove + Quigg LLP

(57) ABSTRACT

A plastic preform, container or article includes a multilayer wall having at least one layer of a matrix resin, at least one layer of a barrier resin, an adhesion-promoting material blended with the barrier resin and/or matrix resin, and an active oxygen barrier composition blended with the barrier resin and/or matrix resin. The adhesion-promoting material promotes bonding between the barrier and matrix resin layers and includes an amine polymer, preferably an imine polymer having a number of available primary, secondary or tertiary amine groups. The matrix resin preferably is an ester-containing resin, such as PET. The barrier resin preferably is EVOH. The active oxygen barrier composition includes a metal with an additive compound, and may also include a host polymer.

2 Claims, 5 Drawing Sheets

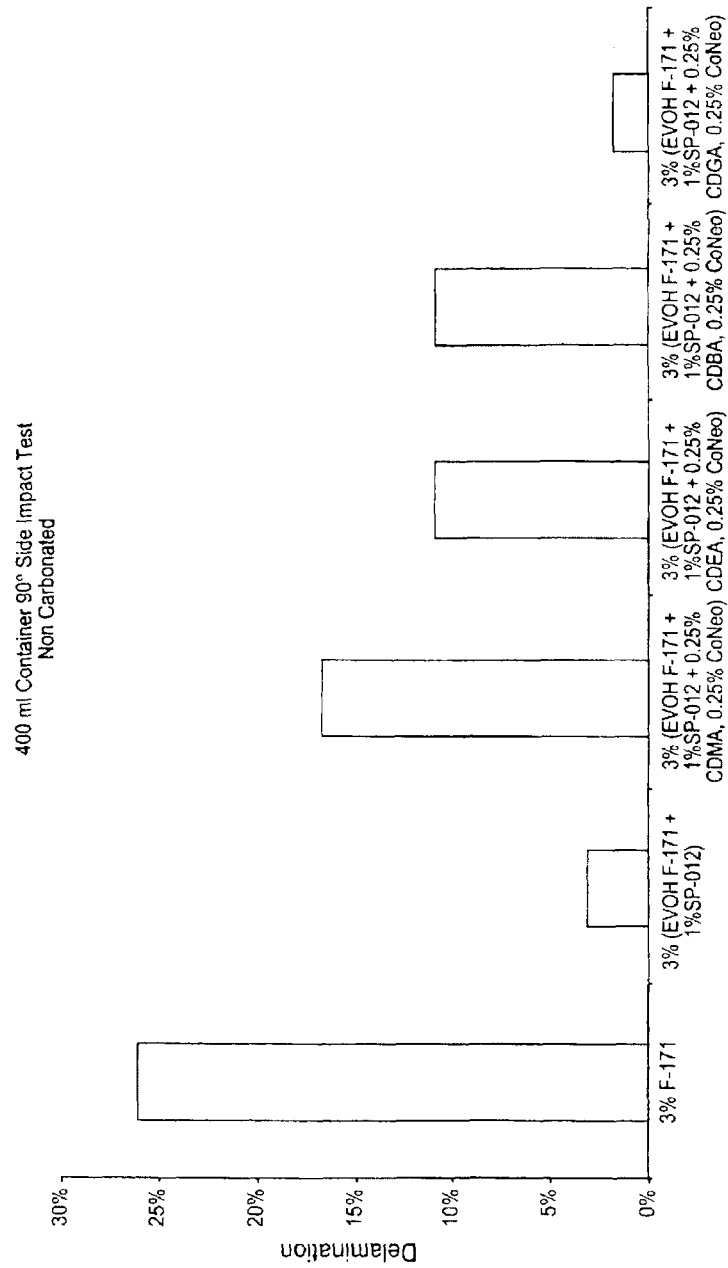

DELAMINATION-RESISTANT MULTILAYER CONTAINER PREFORM, ARTICLE AND METHOD WITH OXYGEN BARRIER FORMULATIONS

The present invention is directed to multilayer plastic containers, preforms and articles of manufacture, and more specifically to multilayer plastic containers and preforms that are resistant to delamination and provide a barrier to oxygen permeating through the layers of the container/preform wall.

BACKGROUND OF THE INVENTION

Multilayer plastic containers and preforms typically include one or more layers of plastic matrix resin, such as polyethylene terephthalate (PET), alternating with one or more layers of barrier resin such as polyamide or polyethylene vinyl alcohol copolymer (EVOH) to resist transmission of gas, water vapor and/or flavorants, including odorants and essential oils, through the container wall. Interlaminar adhesion among the several layers of the multilayer wall is necessary in order to resist delamination of these layers and to enhance barrier properties. Furthermore, the plastic material of the matrix layers typically is susceptible to relatively high permeation of substances such as oxygen, carbon dioxide and water through its polymeric/molecular structure. Permeation of these substances, particularly oxygen, can deteriorate the quality of the contents of the product packaged within the container.

In U.S. application Ser. No. 10/688,432, interlaminar adhesion between the several layers of a multilayer plastic container/preform was improved by incorporating at least one layer of a matrix resin, at least one layer of a barrier resin, and an adhesion-promoting material blended with the barrier and/or the matrix resin in the container/preform wall. The matrix resin included an ester-containing resin, preferably a polyester such as PET. The adhesion-promoting material included an amine polymer having a number of available primary, secondary and tertiary amine groups. The barrier resin included EVOH or polyamide.

In U.S. Provisional Application 60/473,024, an active oxygen barrier composition was used to retard oxygen from permeating through a multilayer plastic wall. These active oxygen barrier compositions included one or more polymers and low molecular weight additives. The active oxygen barrier composition included a metal, an additive compound, and possibly a host polymer.

What is needed is a combination of both an adhesive-promoting material and an active oxygen barrier composition in the barrier layer and/or matrix layer of the multilayer plastic container/preform wall that is effective and achieves desirable results. Thus, it is an object of the present invention to provide a multilayer plastic container, preform or article of manufacture having suitable interlaminar adhesion between the several layers of the multilayer wall and has a high barrier against permeation of oxygen therethrough.

SUMMARY OF THE INVENTION

In a preferred aspect of the present invention, a plastic preform, container or article of manufacture includes a multilayer wall having at least one layer of a matrix resin, at least one layer of a barrier resin, an adhesion-promoting material blended with the barrier resin and/or matrix resin, and an active oxygen barrier composition blended with the barrier resin and/or matrix resin. The adhesion-promoting material promotes bonding between the barrier resin layer and the matrix resin layer, and the active oxygen barrier composition retards permeation of oxygen.

The adhesion-promoting material is an amine polymer, preferably an imine polymer, having a number of available primary, secondary or tertiary amine groups. The imine polymer preferably is an alkylene imine polymer or an alkylene amine polymer. Alkylene imine polymers, particularly polyethyleneimine (PEI) polymers are particularly preferred.

The matrix polymer preferably is an ester-containing polymer or any suitable polyester resin having an ester in the main polymer chain. Suitable polyesters include polyethylene terephthalate (PET), polybutylene terephthalate (PBT), polypropylene terephthalate (PPT), polyethylene naphthalate (PEN), polyglycolic acid (PGA), polycarbonate (PC) and polylactic acid (PLA). Other suitable matrix polymers include polyacrylates, such as polymethyl methacrylate (PMMA), polyethylene methacrylate (PEMA) and vinyl acetates. Also blends or copolymers of the above including process and post-consumer regrind that consists essentially of the above, where PET-based resins, blends, copolymers and regrinds are particularly preferred. Other matrix polymers may also include polyolefins and polyamides.

The barrier resin preferably is selected from the group consisting of EVOH, polyamide, acrylonitrile copolymers, blends of EVOH and polyamide, nanocomposites of EVOH or polyamide and clay, blends of EVOH and an ionomer, acrylonitrile, cyclic olefin copolymers, polyvinylidene chloride (PVDC), polyglycolic acid (PGA), and blends thereof. EVOH is particularly preferred.

The active oxygen barrier composition includes a metal and a compound comprising the structure

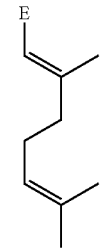

The moiety -E is selected from the group consisting of —C(=O)H, —CH$_2$R$^1$ and —CHR$^1$R$^2$; wherein R$^1$ is —O—R$^3$—R$^4$ or —O—R$^4$, such that R$^1$ comprises at least 2 carbon atoms and does not contain a carbonyl group, and R$^3$ and R$^4$ are independently selected from the group consisting of alkyl, alkenyl, alkynyl, heteroalkyl, aryl and heterocyclic; R$^2$ is —O—R$^5$—R$^6$ or —O—R$^6$, such that R$^2$ comprises at least 2 carbon atoms and does not contain a carbonyl group, and R$^5$ and R$^6$ are independently selected from the group consisting of alkyl, alkenyl, alkynyl, heteroalkyl, aryl and heterocyclic; or R$^1$ and R$^2$, together with the atoms to which they are bonded, form a ring comprising from 5 to 20 ring atoms.

In accordance with another aspect of the present invention, a method of making a multilayer plastic article includes blending with the barrier resin an adhesion-promoting material comprising alkylene amine polymers and an active oxygen barrier composition as described above. The multilayer wall of the preform is formed by incorporating the adhesion-promoting material blend and the active barrier composition in layers alternating with layers of a matrix polymer, or resin, as also described above.

The invention thus provides improved adhesion between the barrier and the matrix layers of the multilayer wall to reduce delamination of the layers during handling and use of the containers. The invention further enhances retardation of oxygen permeation through the several layers of the multilayer wall.

BRIEF DESCRIPTION OF THE DRAWINGS

The invention, together with additional objects, features, advantages and aspects thereof, will be best understood from the following description, the appended claims and the accompanying drawings in which:

FIGS. 3 through 7 are graphic illustrations of test results on containers fabricated in accordance with exemplary embodiments of the present invention.

DETAILED DESCRIPTION OF PREFERRED EMBODIMENTS

The present invention provides a multilayer plastic container, preform or article including an adhesion-promoting material and an active oxygen barrier composition in the multilayer wall. The wall has several layers including at least one layer of a matrix resin, at least one layer of a barrier resin. Preferably, the barrier resin is a thermoplastic resin, such as EVOH, and the matrix resin is an ester-containing resin, such at PET. The adhesion-promoting material is blended with the barrier resin and/or the matrix resin for bonding between the two layers. The adhesion-promoting material is an amine polymer, preferably an imine polymer having a number of available primary, secondary and tertiary amine groups. The active oxygen barrier composition is incorporated into the matrix resin and/or the barrier resin layers. The active oxygen barrier composition includes a metal with an additive compound and may also include a host polymer.

Figures 1A, 1B, 2A, 2B:
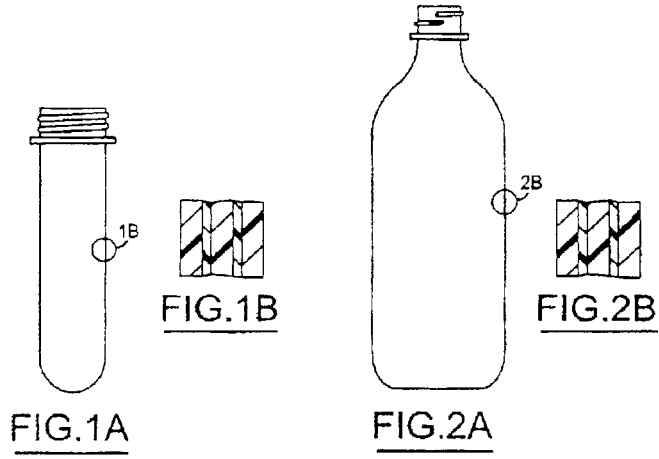
FIGS. 1A and 1B are schematic diagrams of a container preform in accordance with one aspect of the present invention.
FIGS. 2A and 2B are schematic diagrams of a plastic container in accordance with another aspect of the present invention.

In accordance with one aspect of the present invention, the multilayer wall has at least one layer of the matrix resin (also referred to throughout this application as a polyester resin) alternating with at least one layer of the barrier resin, which may contain the active oxygen barrier material. For example, a three-layer wall may have a layer sequence of polyester/barrier/polyester. A five-layer wall may have a layer sequence of polyester/barrier/polyester/barrier/polyester. Post-consumer resin layers may also be included in the multilayer structure. An illustrative depiction of a five-layer preform for blow molding a plastic container is shown in FIGS. 1A and 1B. Likewise, an illustrative depiction of a five-layer container is shown in FIGS. 2A and 2B. For either the preform (shown in FIGS. 1A and 1B) or the container (shown in FIGS. 2A and 2B), the barrier layer or layers may extend throughout the bottom wall and the sidewall of the container or preform, or may be confined to a portion of the sidewall or base. Also the barrier layers may or may not extend into the neck finish of the container or preform.

The barrier resin preferably is a thermoplastic material that has a low gas and/or water vapor transmission rate and/or exhibits a high barrier-to-transmission of flavorants including odorants and essential oils. The following barrier resin materials are preferred: EVOH, polyamide (including amorphous polyamide and semicrystalline polyamide such as MXD6), acrylonitrile copolymers, blends of polyester (e.g., PET) and polyamide, blends of EVOH and an ionomer, cyclic olefin copolymers, PGA, nanocomposites of EVOH or polyamide and clay, polyvinylidene chloride, and blends thereof. EVOH and polyamide are particularly preferred. EVOH is employed as a barrier resin in the examples discussed in this invention. One or more other barrier compositions may also be employed.

The matrix resin, or polymer, is preferably an ester-containing polymer or any suitable polyester resin having an ester in the main polymer chain. Suitable polyesters include polyethylene terephthalate (PET), polybutylene terephthalate (PBT), polypropylene terephthalate (PPT), polyethylene naphthalate (PEN), polyglycolic acid (PGA), polycarbonate (PC) and polylactic acid (PLA). Also, the matrix polymers may include polyacrylates, such as polymethyl methacrylate (PMMA), polyethylene methacrylate (PEMA) and vinyl acetates, polyolefins and polyamides. The matrix resin of the present invention preferably is selected from the group consisting of PET, PEN, blends and copolymers of PET and PEN, and process or post consumer regrind that consists essentially of PET, PEN, or blends or copolymers of PET and PEN. In the examples discussed in the present invention, the resin is PET-based polyester.

The adhesion-promoting material used in the examples of the present invention is blended with the barrier resin (EVOH). As disclosed in U.S. application Ser. No. 10/688,432, which is herein incorporated by reference, the adhesion-promoting material preferably includes an alkylene amine polymer, of which an alkylene imine polymer is preferred, particularly a polyethyleneimine (PEI) polymer. Particularly preferred PEI polymers are EPOMIN (trade name) grade SP-012 polymers manufactures by Nippon Shokubai Co., Ltd. Other PEI polymers may be employed, including other EPOMIN polymers and PEI polymers marketed by other resin manufactures such as BASF under the trade name LUPASOL.

It is preferred that the adhesion-promoting material be blended with the barrier resin. Because the barrier resin layers form a relatively small percentage by weight of the overall preform or container, a lesser quantity of adhesion-promoting material is required than if the adhesion-promoting material is blended with the matrix resin. However, the adhesion-promoting material could be blended with the matrix resin, or with both the matrix resin and the barrier resin.

The amount of adhesion-promoting resin preferably is no more than what is necessary to achieve the desired level of adhesion, as increasing the proportion of adhesion-promoting material may affect the viscosity or other properties of the resin with which it is blended. The amount of adhesion-promoting material blended with the barrier resin or the matrix resin preferably does not exceed about 10%, and more preferably does not exceed 5% by weight of the blend used to form the multilayer article. In this regard, the adhesion-promoting material preferably is blended with a barrier resin, and preferably does not exceed about 10% by weight of the blend. The amount of adhesion-promoting material more preferably does not exceed about 5% by weight of the blend with the barrier resin used to form the multilayer articles. In many applications, the amount of the adhesion-promoting material does not exceed 2% or 3% by weight of the blend with the barrier resin. All blend percentages in this application are by weight unless otherwise indicated.

The active oxygen barrier composition is also incorporated into the plastic layers of the multilayer wall to provide an active oxygen barrier. An "active oxygen barrier" refers to a material having the ability to consume oxygen through chemical and/or physical means. An "active composition" refers to a substance which can be used as an active oxygen barrier material. A "barrier material" is any material that retards permeation for a particular substance, such as oxygen or carbon dioxide, in comparison to another material. Thus, an active oxygen barrier material is one in which consumes oxygen through chemical and/or physical means to retard the permeation of oxygen therethrough. Suitable compounds for the active oxygen barrier composition of the present invention are those disclosed in U.S. Provisional Application 60/473, 024, which is herein incorporated by reference.

The active oxygen barrier composition generally includes compounds containing structure (I):

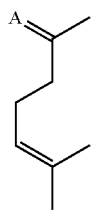

where =A may be an alkenyl group having from 3 to 20 carbon atoms, a cycloalkenyl group having from 5 to 20 carbon atoms, or =CH-E, where -E may be —$CH_2OH$, —$CH(OH)_2$, —$C(=O)H$, —$CH_2R^1$ or —$CHR^1R^2$, where $R^1$ may be —O—$R^3$—$R^4$ or —O—$R^4$, and $R^2$ may be —O—$R^5$—$R^6$ or —O—$R^6$; or $R^1$ and $R^2$, together with the atoms to which they are bonded, form a ring.

Examples of "A" moieties where =A is an alkenyl group include propenyl; methyl propenyl; butenyl; methyl butenyl; pentenyl; methyl pentenyl; dimethyl pentenyl; ethyl pentenyl; hexenyl; methyl hexenyl; dimethyl hexenyl; ethyl hexenyl; diethyl hexenyl; hexadienyl; methyl hexadienyl; dimethyl hexadienyl; ethyl hexadienyl; and diethyl hexadienyl. For example, the compound containing structure (I) and having a 4-methyl-3,5-hexadienyl group as A is commonly referred to as "farnesene." Examples of "A" moieties where =A is a cycloalkenyl group include cyclopentenyl; methyl cyclopentenyl; ethyl cyclopentenyl; cyclohexenyl; methyl cyclohexenyl; ethyl cyclohexenyl; cyclohexadienyl; methyl cyclohexadienyl; ethyl cyclohexadienyl; cycloheptadienyl; cyclooctenyl; and cyclooctadienyl. For example, the compound containing structure (I) and having a 4-methyl-3-cyclohexenyl group as A is commonly referred to as "bisabolene."

For compounds where =A is =CH-E and -E is —$CH_2R^1$ or —$CHR^1R^2$, $R^1$ may be —O—$R^3$—$R^4$ or —O—$R^4$, and $R^2$ may be —O—$R^5$—$R^6$ or —O—$R^6$; or $R^1$ and $R^2$, together with the atoms to which they are bonded, form a ring. The groups $R^3$, $R^4$, $R^5$ and $R^6$ may independently be alkyl, alkenyl, alkynyl, heteroalkyl, aryl or heterocyclic. Preferably, a ring containing $R^1$ and $R^2$ has from 5 to 20 ring atoms, more preferably from 5 to 10 ring atoms. These rings may be hydrocarbon rings or heterocyclic rings, may be substituted or unsubstituted, may be fused to another ring, and may be saturated (i.e. cycloalkyl), unsaturated (i.e. cycloalkenyl), or aromatic (i.e. phenyl).

Preferably, the active oxygen barrier composition includes compounds containing structure (I) where =A is =CH-E. Thus, preferred active bather compositions include compounds containing structure (II):

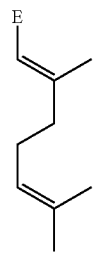

where -E may be —$CH_2OH$, —$CH(OH)_2$, —$C(=O)H$, —$CH_2R^1$ or —$CHR^1R^2$, where $R^1$ may be —O—$R^3$—$R^4$ or —O—$R^4$, and $R^2$ may be —O—$R^5$—$R^6$ or —O—$R^6$; or $R^1$ and $R^2$, together with the atoms to which they are bonded, form a ring. The groups $R^3$, $R^4$, $R^5$ and $R^6$ may independently be alkyl, alkenyl, alkynyl, heteroalkyl, aryl or heterocyclic. Preferably, a ring containing $R^1$ and $R^2$ has from 5 to 20 ring atoms, more preferably from 5 to 10 ring atoms. These rings may be hydrocarbon rings or heterocyclic rings, may be substituted or unsubstituted, may be fused to another ring, and may be saturated (i.e. cycloalkyl), unsaturated (i.e. cycloalkenyl), or aromatic (i.e. phenyl).

Examples of —O—$R^4$ and —O—$R^6$ independently include alkoxy groups ($R^4$ or $R^6$ are $C_1$ to $C_{20}$ alkyl), such as methoxy, ethoxy, propoxy, cyclopropoxy and cyclohexoxy groups, and may be substituted. Examples of —O—$R^4$ and —O—$R^6$ independently include aryloxy groups ($R^4$ or $R^6$ are $C_5$ to $C_{20}$ aryl), such as phenoxy, cresoxy, ethylphenoxy, cumyloxy, and naphthoxy groups, and may be substituted. Examples of —O—$R^3$—$R^4$ and —O—$R^5$—$R^6$ independently include aryl-alkoxy groups ($R^3$ or $R^5$ are $C_1$ to $C_{20}$ alkyl, and $R^4$ or $R^6$ are $C_5$ to $C_{20}$ aryl), such as benzyloxy, 2-ethoxyphenyl and iso-propoxyphenyl groups, and may be substituted on the aryl and/or alkoxy moiety. Examples of —O—$R^3$—$R^4$ and —O—$R^5$—$R^6$ independently include aryl-aryloxy groups ($R^3$ or $R^5$ and $R^4$ or $R^6$ are independently $C_5$ to $C_{20}$ aryl), such as cumylphenoxy, biphenoxy and benzylphenoxy groups, and may be substituted on the aryl and/or aryloxy moiety. Examples of —O—$R^4$ and —O—$R^6$ independently include: heteroalkoxy groups ($R^4$ or $R^6$ are $C_5$ to $C_{20}$ heteroalkyl), such as 2-methoxyethoxy, 2-ethoxyethoxy 2-ethoxyacetate groups, and may be substituted. Examples of —O—$R^4$ and —O—$R^6$ independently include alkenoxy groups ($R^4$ or $R^6$ are $C_2$ to $C_{20}$ alkenoxy), such as propenoxy, butenoxy, isopropenoxy, pentadienoxy, cyclopentenoxy, cyclohexenoxy, oleyloxy, undecylenoxy, geranyloxy, farnesoxy and nerolidoxy groups, and may be substituted.

For compounds of the active oxygen barrier composition containing structure (II) where $R^1$ and $R^2$, together with the atoms to which they are bonded, form a ring, the compounds can be represented as structure (III):

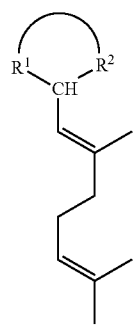

The tertiary carbon atom positioned directly between $R^1$ and $R^2$ is referred to herein as the "bridgehead" carbon. The closed ring is thus formed by the bridgehead carbon, $R^1$, $R^2$, and the other atoms between $R^1$ and $R^2$. Examples of rings containing both $R^1$ and $R^2$ include rings containing the bridgehead carbon bonded to the group —$R^1$—$R^2$—, where —$R^1$—$R^2$— can be an alkyl group such as butyl (—$C_4H_8$—) or pentyl (—$C_5H_{10}$—); an alkenyl group such as butenyl or pentenyl; a heterocyclic group such as 1,4-butyl-di-oxy (—O—$C_4H_8$—O—), 1,4-butyl-di-oxy (—O—$C_5H_{10}$—O—), ethylene glycoxy (—O—$C_2H_4$—O—) and diethylene glycoxy (—O—$C_2H_4$—O—$C_2H_4$—O—); and an aryl group such as catechol (—O-(ortho-$C_6H_4$)—O—); and may be substituted. Thus, a ring containing bridgehead carbon and the group —$R^1$—$R^2$— may be a cycloalkyl group, a cycloalkenyl group, an aryl group, and a heterocyclic group. For example, if —$R^1$—$R^2$— is a heterocyclic group, the ring may be similar to a crown ether, containing from 1 to 5 oxygen atoms, or preferably containing from 2 to 3 oxygen atoms; and containing from 3 to 9 carbon atoms, or from 2 to 6 carbon atoms.

The presence of one or more compounds of the present invention as an additive in a polymer material can impart active oxygen barrier properties to the composition. In the context of a closed environment with which the active composition, or material containing the active composition, is in contact, the consumption of molecular oxygen may eliminate or substantially reduce the net ingress of oxygen into the environment. Moreover, the consumption of molecular oxygen may reduce the total enclosed amount of molecular oxygen.

Examples of compounds of the present invention include compounds containing structure (II) where -E is —$CHR^1$ (—O—$R^6$), where $R^6$ is an alkyl group containing from 1 to 20 carbon atoms; where $R^6$ is an alkenyl group containing from 2 to 20 carbon atoms; and where $R^6$ is an alkenyl group containing from 4 to 20 carbon atoms and also having 2 or more carbon-carbon double bonds.

Examples of compounds of the present invention include compounds containing structure (II) where -E is —$CHR^1$ (—O—$R^5$—$R^6$), where $R^5$ is an alkyl group containing from 1 to 20 carbon atoms; where $R^5$ is an alkyl group containing from 2 to 20 carbon atoms; where $R^5$ is an alkenyl group containing from 2 to 20 carbon atoms; and where $R^5$ is an aryl group containing from 5 to 20 carbon atoms. These examples further include compounds where $R^6$ is an alkyl group containing from 1 to 20 carbon atoms; where $R^6$ is an alkyl group containing from 2 to 20 carbon atoms; where $R^6$ is an alkenyl group containing from 2 to 20 carbon atoms; and where $R^6$ is an aryl group containing from 5 to 20 carbon atoms. These examples further include compounds where $R^5$ is an alkyl group containing from 1 to 20 carbon atoms and $R^6$ is an aryl group containing from 5 to 20 carbon atoms. These examples further include compounds where $R^5$ is an aryl group containing from 5 to 20 carbon atoms and $R^6$ is an aryl group containing from 5 to 20 carbon atoms.

Examples of compounds of the present invention include compounds containing structure (II) where -E is —$CH_2$(—O—$R^4$), where $R^4$ is an alkyl group containing from 1 to 20 carbon atoms; where $R^4$ is an alkenyl group containing from 2 to 20 carbon atoms; and where $R^4$ is an alkenyl group containing from 4 to 20 carbon atoms and also having 2 or more carbon-carbon double bonds.

Examples of compounds of the present invention include compounds containing structure (II) where -E is —$CH_2$(—O—$R^3$—$R^4$), where $R^3$ is an alkyl group containing from 1 to 20 carbon atoms; where $R^3$ is an alkenyl group containing from 2 to 20 carbon atoms; and where $R^3$ is an aryl group containing from 5 to 20 carbon atoms. These examples further include compounds where $R^4$ is an alkyl group containing from 1 to 20 carbon atoms; where $R^4$ is an alkenyl group containing from 2 to 20 carbon atoms; and where $R^4$ is an aryl group containing from 5 to 20 carbon atoms. These examples further include compounds where $R^3$ is an alkyl group containing from 1 to 20 carbon atoms and $R^4$ is an aryl group containing from 5 to 20 carbon atoms. These examples further include compounds where $R^3$ is an aryl group containing from 3 to 20 carbon atoms and $R^4$ is an aryl group containing from 5 to 20 carbon atoms.

Examples of compounds of the present invention include compounds containing structure (II) where -E is —$CH_2R^1$ or —$CH$—$R^1R^2$, and $R^1$ and/or $R^2$ are moieties such as —$OCH_3$ (CDMA); —$OCH_2CH_3$ (CDEA); —$OCH=C(CH_3)(CH_2)_2CH=C(CH_3)_2$ (CDGA); and —$OCH_2$—$C_6H_5$ (CDBA).

Specific examples of compounds of the present invention that can be used as additives include the following:
citral—structure (II), E is $C(=O)H$;
geraniol—structure (II), E is $CH_2OH$;
citral dimethyl acetal—structure (II), E is $CH(OCH_3)_2$;
citral diethyl acetal—structure (II), E is $CH(OCH_2CH_3)_2$;
citral dipropyl acetal—structure (II), E is $CH(OCH_2CH_2CH_3)_2$;
citral digeranyl acetal structure (II), E is
$CH(OCH=C(CH_3)(CH_2)_2CH=C(CHs)_2)_2$;
undecylenic aldehyde—structure (II),
digeranyl acetal E is $CH_2(OCH(CH=CH(CH_2)_7CH_3)$ (UADA) $(OCH_2CH=C(CH_3)(CH_2)_2CH=C(CH_3)_2)$
citral ethylene glycyl acetal—structure (II), E is a ring designated (—$R^1$—$R^2$—),
which is —O— $(CH_2)_2$—O—;
citral diethylene—structure (II), E is a ring designated (—$R^1$—$R^2$—),
glycyl acetal which is —O— $(CH_2)_2$—O— $(CH_2)_2$—O—;
citral dibenzyl acetal—structure (II), E is $CH(OCH_2$—$C_6H_5)_2$;
citral dicumylphenyl acetal—structure (II), E is $CH(OC_6H_4$—$C(CH_3)_2$—$C_6H_5)_2$;
farnesene—structure (II), A is $=CHCH_2CH=C(CH_3)CH=CH_2$;
and bisabolene—structure (I), A is 4-methyl-3-cyclohexene.

The preferred compounds of the active oxygen barrier composition are compounds containing structure (II), where E is either an aldehyde (—$C(=O)H$) or is —$CH_2R^1$ or —$CHR^1R^2$, where at least one of $R^1$ or $R^2$ is an ether group having at least two carbon atoms. These preferred compounds include compounds where $R^1$ and $R^2$ form an ether-containing ring as described above. Preferably, if E is —$CH_2R^1$ or —$CHR^1R^2$, neither $R^1$ nor $R^2$ contain a carbonyl functionality ($>C=O$) or a terminal hydroxyl functionality (—$CH_2OH$). Particularly preferred compounds of the present invention are compounds containing structure (II), where E is either an aldehyde (—$C(=O)H$) or is —$CH_2R^1$ or —$CHR^1R^2$, where at least one of $R^1$ or $R^2$ is an ether group having at least three carbon atoms. Preferably, the compounds of the present invention include citral, citral diethyl acetal, citral digeranyl acetal, UADA, citral ethylene glycyl acetal, citral diethylene glycyl acetal, citral dibenzyl acetal, citral dicumylphenyl acetal, and bisabolene. Particularly preferred compounds of the present invention include citral, citral digeranyl acetal, citral ethylene glycyl acetal, citral diethylene glycyl acetal, citral dibenzyl acetal, citral dicumylphenyl acetal, citral diethyl acetal and citral dimethyl acetal.

Metals that may be used with an additive compound of the active oxygen barrier composition include transition metals.

Examples of transition metals include iron, cobalt, nickel, ruthenium, rhodium, palladium, osmium, iridium, platinum, copper, manganese and zinc. The metal may be added as a salt or complex with another element or chemical group. For example, the metal may be added as a complex with an organic ligand such as a carboxylate, an amine, or an alkene. Examples of ligands which may form complexes with the above transition metals include naphthenate, octoate, tallate, resinate, 3,5,5-trimethylhexoate, stearate, palmitate, 2-ethylhexanoate, neodecanoate, acetate, butyrate, oleate, valerate, cyclohexanebutyrate, acetylacetonate, benzaylacetonate, dodecylacetylacetonate, benzoate, oxalate, citrate, tartrate, dialkyldithiocarbamate, disalicylalethylenediamine chelate, and phythalocyanine. Examples of specific metal complexes which may be useful include cobalt (II) 2-ethylhexanoate, cobalt (II) neodecanoate, cobalt (II) acetate, and cobalt (II) oleate.

A polymeric material may be used as a host polymer to provide an active oxygen barrier composition in combination with the compound of the present invention and the metal. Examples of host polymers include polyolefins, such as polyethylene, polypropylene, polyisoprene, polybutadiene and polyvinyl alcohol); styrenic polymers, such as polystyrene and poly(4-methylstyrene); polyacrylates, such as poly(m-ethyl acrylate), poly(ethyl acrylate), poly(methyl methacrylate), and poly(ethyl methacrylate); polyamides, such as nylon-6,6, nylon 6, nylon 11, and polycaprolactam; other nitrogen-containing polymers, such as polyacrylamide, polyacrylonitrile and poly(styrene-co-acrylonitrile); halogenated polymers such as poly(vinyl chloride), poly(vinylidene chloride) and polytetrafluoroethylene; polyesters, such as poly(ethylene terephthalate), poly(butylene terephthalate), 16 poly(ethylene naphthalate), poly(lactic acid), and poly(glycolic acid); polycarbonates, such as poly(4,4'-isopropylidine-diphenyl carbonate); polyethers, such as poly(ethylene oxide), poly(butylene glycol), poly(epichlorohydrin), and poly(vinyl butyral); heterocyclic polymers, such as polyimides, polybenzimidazoles, polybenzoxazoles, and poly(vinyl pyrrolidone); other engineering polymers such as polysulfones, poly(ether ether ketones), poly(phenylene oxide), and poly(phenylene sulfide); inorganic polymers, such as polysiloxanes, polysilanes, and polyphosphazenes; natural polymers and their derivatives, such as dextran, cellulose, and carboxymethyl cellulose; and ionomers, such as sulfonated polymers (i.e. sulfonated polystyrene) and carboxylic acid-containing polymers (i.e. copolymers of acrylic acid or methacrylic acid). Examples of host polymers also include copolymers of the repeating units of these and other polymers and include mixtures (i.e. blends) of these polymers.

Preferred host polymers include polymers that are conventionally used for packaging, either alone or in combination with other polymers. Examples of polymers used for packaging include polyethylene (PE), polypropylene (PP), polystyrene, poly(methyl acrylate), poly(methyl methacrylate), poly(ethyl acrylate), poly(ethyl methacrylate), poly(vinyl alcohol) (PVOH), poly(ethylene: co-vinyl alcohol) (EVOH), poly(ethylene-co-methyl acrylate) (EMAC), polyacrylonitrile (PAN), poly(styrene-co-acrylonitrile) (SAN), poly(styrene-co-malefic anhydride), poly(vinyl chloride) (PVC), poly (vinylidene chloride) (PVDC), poly(ethylene terephthalate) (PET), poly(butylene terephthalate) (PBT), poly(ethylene naphthalate) (PEN), poly(lactic acid), and poly(glycolic acid). Some of these and other polymers can be used as barriers materials, especially in multilayer packages. Exemplary barrier materials include EVOH, PEN, PVOH, PVDC, PAN, and poly(glycolic acid).

The additive compound of the present invention may be mixed with the metal and the host polymer by a variety of methods. For example, the compound, the metal and the host polymer may be dissolved in a common solvent and cast into a film or sprayed onto another polymer as a coating. The solvent may be evaporated to provide a solid material. The compound may be added to the host polymer without any solvent, and the two components can be mixed mechanically. Mechanical mixing may further be carried out at elevated temperatures by thermal processing techniques known to those skilled in the art. The metal can be mixed with the additive compound prior to contacting the host polymer with the additive, or the metal can be mixed with the host polymer separately. For example, the metal may be added to the host polymer prior to the contact between the host polymer and the additive compound, or the metal may be added to the combined host polymer and additive compound. The additive compound and metal may also be mixed together, and this mixed composition added to the host polymer.

The combination of the additive compound of the present invention and the metal, optionally including a host polymer, provides an active oxygen barrier composition, also referred to herein as the "active composition." For example, an active composition containing a compound of the present invention and a metal without a host polymer may be deposited on a polymer substrate. In another example, an active composition containing a compound of the present invention, a metal and a host polymer may be formed into a single-layer package. In another example, an active composition containing a compound of the present invention, a metal and a host polymer may be formed as a portion or layer of a package. The active composition may be used alone for making a polymer-based product, or it may be used in combination with other polymers. A host polymer containing a compound of the present invention and the metal can be blended with a different polymer to form the overall active composition. The second polymer may contain no additives, or it may contain a compound of the present invention and/or a metal, and the compound of the present invention and/or the metal may be the same as or different from those present in the original host polymer. The use of polymer blends in packaging materials is described for example in U.S. Pat. Nos. 6,399,170 B1 and 6,395,865 B2, which are incorporated herein by reference.

When a host polymer is present in the active oxygen barrier composition, the additive compound of the present invention is preferably present in the active oxygen barrier composition in a concentration from about 0.001 percent by weight (wt %) to about 5 wt %. More preferably, the compound is present in a concentration from about 0.05 wt % to about 3 wt %. If a metal is present in the active oxygen barrier polymer, it is preferred that the concentration be of at least about 30 parts per million (ppm). If a metal is present, its concentration is from about 30 ppm to about 5,000 ppm, even more preferably from about 100 ppm to about 3,000 ppm, and still more preferably from about 200 ppm to about 2,500 ppm.

The methods and/or processes in which the adhesion-promoting material produced and incorporated within the matrix resin and/or barrier resin layers are disclosed in U.S. application Ser. No. 10/688,432, which is herein incorporated by reference. Likewise, the methods and/or processes in which the active oxygen barrier composition is produced and incorporated within the matrix resin and/or barrier resin layers are disclosed in U.S. Provisional Application 60/473,024, which is incorporated herein by reference.

Figure 4:
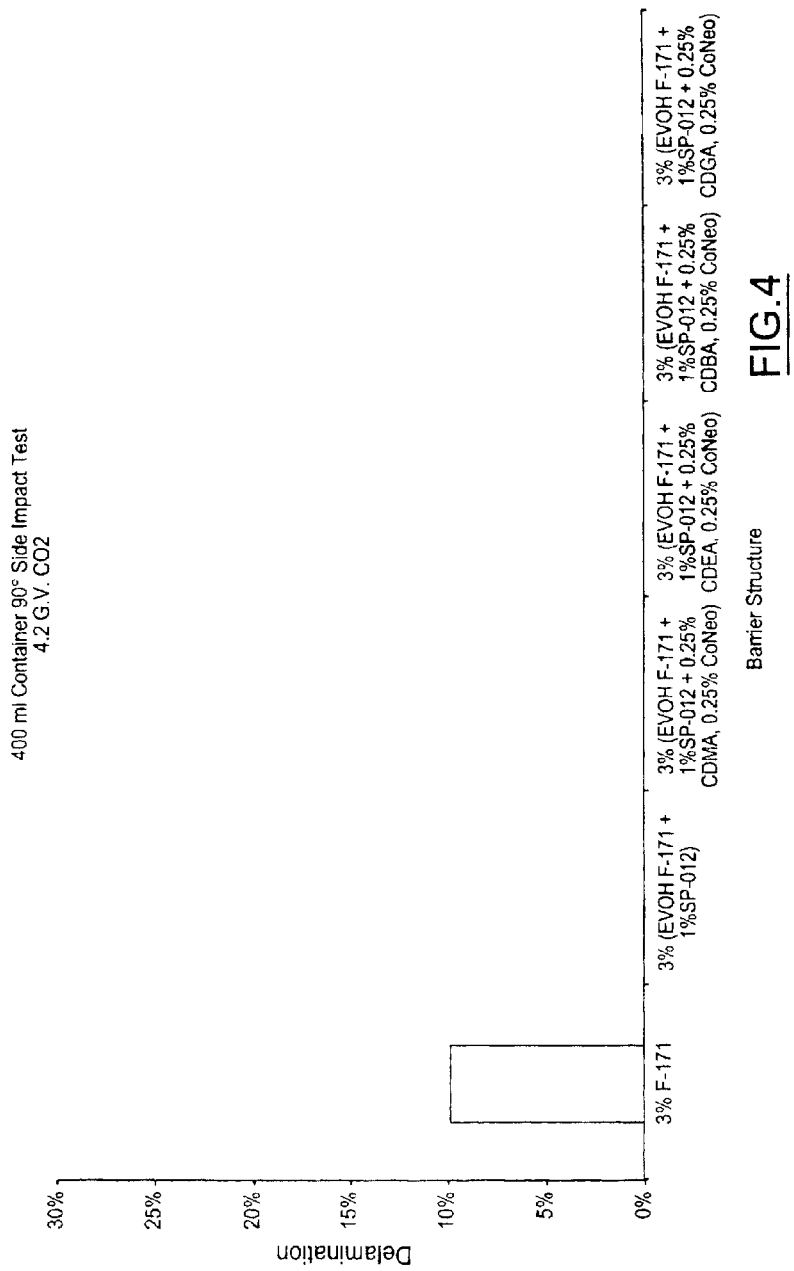
Figure 5:
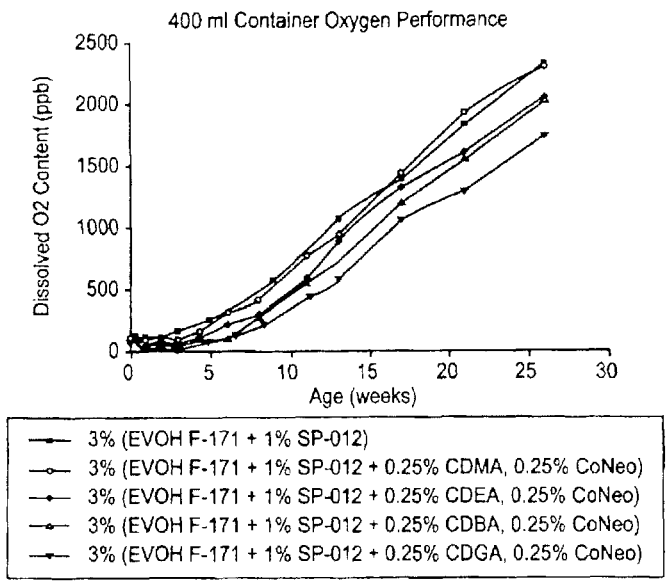
Figure 6:
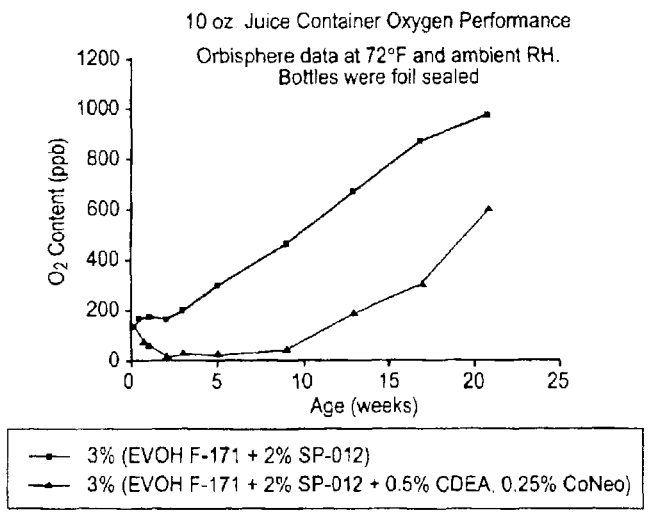
Figure 7:
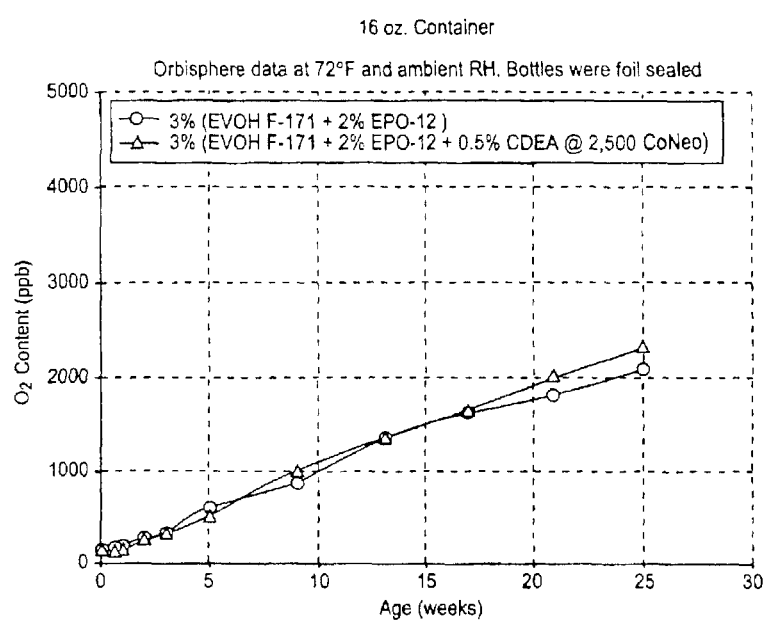

FIGS. 3-5 illustrate test results on 400 ml cylindrical container samples constructed in accordance with the present invention, and FIG. 6 illustrates test results on a 10 oz generally cylindrical juice container. FIG. 7 illustrates test results on a 16 oz. cylindrical container. Each container has a five-layer wall of PET/barrier/PET/barrier/PET configuration. The 400 ml cylindrical test containers have a 13 mil nominal sidewall of 3/0.516/0.5/3 mil layer thickness respectively. The preform for the 400 ml container had a twenty-six second cycle production time. The 10 oz juice containers have a 16 mil nominal sidewall of 4.5/0.5/6.0/0.5/4.5 mil layer thickness respectively. The preform for the 10 oz juice container had a 25.8 second cycle production time. The 16 oz containers have 16 mil nominal sidewall of 4.5/0.5/6.0/0.5/4.5 mil layer thickness respectively. The preform for the 16 oz container had a 42.6 second cycle production time. The barrier layer is EVOH, as further described in the respective figures. In all tests, the containers are experimental containers constructed for comparison purposes only. The tests are arbitrarily devised to obtain differentiation in data and do not reflect any performance specification or conditions of use. In FIGS. 3-4, the ordinate indicates the percentages of containers in which delamination is observed by visual inspection. The abscissa identifies container structure, specifically the type and total amount of barrier material and/or active barrier composition by weight. In FIGS. 5-7, the ordinate indicates the dissolved oxygen content (in water) in parts per billion (ppb) measured inside the test container. The abscissa indicates the age (in weeks).

In all of the tests shown in FIGS. 3-7 and Tables I and II, the adhesion-promoting material is a grade SP-012 PEI material marketed under the trade name EPOMIN by Nippon Shokubai Co., Ltd. This material has the following properties according to the resin manufacturer:

| | |
|---|---|
| Molecular weight | 1200 (approx.) |
| Specific gravity | 1.05 @ 25° C. |
| Amine value | 19 mg eq./g solid |
| Freezing point | Less than −20° C. |
| Decomposition temperature | 290° C. |
| Flash point | 260° C. |
| Amine ratios | |
| primary | 35% |
| secondary | 35% |
| tertiary | 30% |

Chemical Abstract Specification (CAS) No. 106899-94-9

The grade SP-012 material is stated by the manufacturer to be soluble in water and alcohol, partially soluble in ethylacetate, THF and toluene, and insoluble in n-hexane.

FIGS. 3 and 4 illustrate side-impact test results on the 400 ml cylindrical containers for non-carbonated and carbonated beverages, respectively. This side-impact testing involves a single impact, at a 90° angle, against the container sidewall with a steel wedge and with the container clamped in stationary position. The energy of the impact is approximately 3.3 joules. FIG. 3 illustrates test results with the containers filled with non-carbonated water, while FIG. 4 illustrates test results with the containers filled with carbonated water at 4.2 GV (gas volumes). The barrier resin layers totaled 3% by weight of the containers. In the samples having an adhesion-promoting material, the adhesion-promoting material constitutes about 1% of the barrier layer weight. In the samples having an active oxygen barrier composition, the barrier layer includes about 0.25% of the additive compound and includes cobalt neodecanoate (CoNeo) at about 0.25% of the barrier layer weight. Also for each sample containing an oxygen barrier material, the active oxygen barrier composition comprises a different additive, namely citral dimethyl acetal (CDMA), citral diethyl acetal (CDEA), citral dibenzyl acetal (CDBA) and citral digeranyl acetal (CDGA).

In the non-carbonated samples of FIG. 3, the presence of SP-012 improved delamination performance. In the carbonated samples of FIG. 4, however, the presence of the adhesion-promoting material and/or the oxygen barrier material (regardless of the type of oxygen barrier material) causes delamination of the multilayered wall to reach 0%, whereas the sample with only the EVOH layer demonstrates a delamination of about 10%.

FIG. 5 illustrates the barrier properties as a function of time in sealed 400 ml cylindrical containers. The package was filled with nitrogen-purged water, and was induction foil sealed with an aluminum-foil based seal. The filled and sealed container was stored at ambient conditions of 72° F. and 50% relative humidity. The water in the filled and sealed containers of FIG. 5 was analyzed for dissolved oxygen content over time. The oxygen in the water was measured with an ORBISPHERE 3600 instrument. FIG. 5 is a graph of the dissolved oxygen content as a function of time. The ORBISPHERE tests were run on similar test samples used for the side-impact test for determining the percent delamination of the multilayered wall, with the exception of the EVOH variable. As shown in FIG. 5, the oxygen content inside the test containers for each sample increased over time. However, with the exception of the sample that contained CDGA, the dissolved oxygen content of all containers was lower than the sample which contained EVOH plus adhesion promoting material only. Thus the barrier performance of the containers was enhanced with the other additive compounds.

Table I contains drop impact delamination results for the 10 oz juice containers. The containers were filled with 185° F. water and were immediately capped with polypropylene closures which were lined with an elastomeric lining material. The capped containers were held for two minutes and then were immersed into cool water so as to cool the contents to room temperature. The

TABLE I

| Barrier | 18" Drop | 36" Drop |
|---|---|---|
| 3% (EVOH F-171 + 2% EPO-012) | 0% | 0% |
| 3% (EVOH F-171 + 2% EPO-012 + 0.5% CDEA @ 2,500 ppm CoNeo) | 0% | 0% |

*Same container as used for O₂ Barrier Testing in FIG. 6 containers were removed from the cooling water and were allowed to equilibrate to room temperature (72° F.) for a period of twenty-four hours prior to testing. The drop impact delamination testing consisted of dropping the containers from a given height onto a hard concrete floor. The base of the containers impacted the floor once and a visual inspection of the container was performed so as to determine the presence of delamination in any part of the container. Testing was performed at drop heights of 18 inches and 36 inches. In these samples, the barrier resin layers totaled 3% by weight of the container. In all samples, the adhesion promoting material contributes about 2% of the barrier layer weight. In the sample containing an active oxygen barrier composition, the barrier layer includes about 0.5% of citral diethylene glycol and includes cobalt neodecanoate at about 0.25% of the barrier layer weight. For both sets of containers, there were no noted instances of delamination at either the 18 inch or 36 inch drop height.

FIG. 6 illustrates the barrier properties as a function of time in sealed 10 oz juice containers. The package was filled with nitrogen-purged water and was induction foil sealed with an aluminum foil based seal. The filled and seal containers were stored at ambient conditions of 72° F. and 50% relative humidity and the water in the filled and sealed containers was analyzed for dissolved oxygen content over time utilizing an ORBISPHERE 3600 instrument. The ORBISPHERE tests were run on similar test samples used for the drop impact testing as described in Table I. As shown in FIG. 6, the oxygen content inside the containers containing only EVOH and the adhesion promoting material increased over time. In the samples containing the adhesion promoting material and the active oxygen barrier composition, the dissolved oxygen content decreased during the first two weeks and increased very little during the first nine weeks and subsequently increased at a greater rate during the first eleven weeks of the test. Clearly, the barrier performance of these containers was enhanced with the addition of the active oxygen composition to the adhesion promoting material and EVOH.

Table II contains side-impact test results on the 16 oz cylindrical containers for non-carbonated

TABLE II

| Barrier | Non-Carbonated | Carbonated @ 3.0 GV |
|---|---|---|
| 3% (EVOH F-171 + 2% EPO-012) | 0% | 0% |
| 3% (EVOH F-171 + 2% EPO-012 + 0.5% CDEA @ 2,500 ppm CoNeo) | 0% | 0% | and carbonated beverages, respectively. The 90° side-impact methodology was utilized as described and used previously for the 400 ml cylindrical containers. Table II contains test results for containers filled with non-carbonated water and for containers filled with carbonated water at 3.0 GV. The barrier resin layers totaled 3% by weight of the containers and the adhesion promoting material constituted about 2% of the barrier layer by weight. In the samples having an active oxygen barrier composition, the barrier layer includes about 0.5% of CDEA and about 0.25% cobalt neodecanoate (Co-Neo). As noted in the table, there was no delamination observed for either container regardless of whether the container was filled with either non-carbonated or carbonated water.

FIG. 7 illustrates the barrier properties as a function of time in sealed 16 oz cylindrical containers. These containers were filled with nitrogen-purged water and were induction foil sealed with an aluminum foil based seal. The filled and sealed containers were stored at ambient conditions of 72° F. and 50% relative humidity and were analyzed for dissolved oxygen content over time with an ORBISPHERE 3600 instrument. FIG. 7 is a graph of the dissolved oxygen content as a function of time. The ORBISPHERE tests were run on similar test samples described in Table II. As shown in FIG. 7, the oxygen content inside the test containers for each sample increased similarly over time. The oxygen barrier performance of these 16 oz containers, which contained the CDEA and cobalt neodecanoate, was much different from the behavior of this additive as previously observed in FIGS. 5 and 6, where there was an increase in oxygen bather performance in reference to containers containing only EVOH and the adhesion-promoting material. Although not to be bound by theory, one potential explanation for this anomaly in barrier performance may be due to the much longer injection cycle times utilized in making the preforms for the 16 oz cylindrical container (42.6 seconds) vs. the 400 ml cylindrical container (26.0 seconds) and 10 oz juice container (25.8 seconds). Potentially, the CDEA may have thermally degraded and/or evaporated during the much longer time in the injection molding melt phase. Evidence in support of this may be seen in the barrier performance of the CDEA additive in the barrier performance of this barrier variable in FIGS. 5 and 6, the containers of which have similar injection cycle times. It would appear that the barrier performance of this variable increases in the example of FIG. 6 where the CDEA is added at 0.5% versus that of 0.25% in FIG. 5. In each of these examples, the barrier performance is still better than that of the container variable containing only EVOH and the adhesion-promoting material. As such, potentially decreasing injection molding cycle time in producing the preforms for the 16 oz cylindrical containers and/or addition of a higher quantity of the CDEA would result in increased barrier performance for this container example.

There have thus been disclosed a multilayer container, a multilayer perform, a barrier resin blend for use in a multilayer container, a method of making a multilayer perform or container, and a method of making a multilayer plastic article of manufacture that fully satisfy all of the objects previously set forth. The container, barrier blend and method of manufacture have been disclosed in conjunction with a number of exemplary embodiments thereof, and several modifications and variations have been discussed. Other modifications and variations will readily suggest themselves to a person of ordinary skill in the art. The invention is intended to embrace all such modifications and variations that fall within the spirit and broad scope of the appended claims.

The invention claimed is:

1. A composition comprising an active oxygen barrier composition blended with a barrier resin, the barrier resin comprising EVOH, and the active oxygen barrier composition comprising polyethyleneimine and cobalt neodecanoate, and an additive comprising citral digeranyl acetal.

2. The composition of claim 1, wherein the composition comprises about 1% by weight of the composition of polyethyleneimine, about 0.25% by weight of the composition of cobalt neodecanoate, and about 0.25% by eight of the composition of citral digeranyl acetal.

* * * * *

UNITED STATES PATENT AND TRADEMARK OFFICE
CERTIFICATE OF CORRECTION

PATENT NO. : 8,877,853 B2  
APPLICATION NO. : 13/306230  
DATED : November 4, 2014  
INVENTOR(S) : Philip D. Bourgeois Page 1 of 1

It is certified that error appears in the above-identified patent and that said Letters Patent is hereby corrected as shown below:

In the claims:

In claim 2, line 4 "eight" should be -- weight --.

Signed and Sealed this  
Tenth Day of February, 2015

Michelle K. Lee  
*Deputy Director of the United States Patent and Trademark Office*